(12) United States Patent
Golden et al.

(10) Patent No.: US 11,014,589 B2
(45) Date of Patent: May 25, 2021

(54) VEHICLE COLLISION AVOIDANCE SYSTEM

(71) Applicant: General Electric Company, Schenectady, NY (US)

(72) Inventors: Samuel William Golden, Melbourne, FL (US); Jason William Brown, Melbourne, FL (US); Scott Dulmage, Melbourne, FL (US); David Eldredge, Melbourne, FL (US)

(73) Assignee: TRANSPORTATION IP HOLDINGS, LLC, Norwalk, CT (US)

( * ) Notice: Subject to any disclaimer, the term of this patent is extended or adjusted under 35 U.S.C. 154(b) by 386 days.

(21) Appl. No.: 15/981,698

(22) Filed: May 16, 2018

(65) Prior Publication Data

US 2018/0362057 A1   Dec. 20, 2018

Related U.S. Application Data

(60) Provisional application No. 62/521,698, filed on Jun. 19, 2017.

(51) Int. Cl.
*B61L 23/30* (2006.01)
*B61L 23/34* (2006.01)
(Continued)

(52) U.S. Cl.
CPC ............... *B61L 23/30* (2013.01); *B61L 7/00* (2013.01); *B61L 7/06* (2013.01); *B61L 15/0027* (2013.01); *B61L 23/34* (2013.01); *B61L 25/021* (2013.01); *B61L 25/023* (2013.01); *B61L 25/025* (2013.01); *B61L 25/028* (2013.01); *G05D 1/0027* (2013.01); *G05D 1/0287* (2013.01); *G05D 1/0291* (2013.01);
(Continued)

(58) Field of Classification Search
CPC .. B61L 23/30; B61L 7/06; B61L 23/34; B61L 25/021; B61L 25/023; B61L 15/0027; B61L 25/028; B61L 25/025; B61L 7/00; B61L 2201/00; B61L 25/04; G08G 1/20; G08G 1/163; G05D 1/0027; G05D 1/0293; G05D 1/0287; G05D 1/0291
See application file for complete search history.

(56) References Cited

U.S. PATENT DOCUMENTS 6,218,961 B1   4/2001   Gross et al.
8,630,757 B2 *  1/2014   Daum et al. .......... B61L 25/025
                                                    701/301

(Continued)

*Primary Examiner* — Dale W Hilgendorf
(74) *Attorney, Agent, or Firm* — Josef L. Hoffmann; The Small Patent Law Group, LLC

(57) ABSTRACT

A collision avoidance system obtains movement indicative data of plural vehicles included in separate vehicle systems. The movement indicative data can be obtained from sensors onboard the vehicles. The system determines an identification of which of the vehicles are included in the separate vehicle systems based on the movement indicative data that are obtained and determines a collision risk between two or more vehicle systems of the separate vehicle systems based on the movement indicative data that are obtained and the identification of which of the vehicles are in the separate vehicle systems. The system automatically changes movement of at least one of the two or more vehicle systems responsive to determining the collision risk.

18 Claims, 2 Drawing Sheets

(51) Int. Cl.
  *B61L 25/02* (2006.01)
  *B61L 15/00* (2006.01)
  *B61L 7/00* (2006.01)
  *B61L 7/06* (2006.01)
  *G08G 1/00* (2006.01)
  *G08G 1/16* (2006.01)
  *G05D 1/00* (2006.01)
  *G05D 1/02* (2020.01)
  *B61L 25/04* (2006.01)

(52) U.S. Cl.
  CPC ........... *G05D 1/0293* (2013.01); *G08G 1/163* (2013.01); *G08G 1/20* (2013.01); *B61L 25/04* (2013.01); *B61L 2201/00* (2013.01)

(56) References Cited

U.S. PATENT DOCUMENTS

| | | | | |
|---|---|---|---|---|
| 2005/0107954 | A1* | 5/2005 | Nahla | B61L 25/025 701/301 |
| 2010/0268466 | A1* | 10/2010 | Amutham | B61L 25/025 701/301 |
| 2012/0296562 | A1* | 11/2012 | Carlson et al. | B61L 25/025 701/301 |
| 2014/0249693 | A1* | 9/2014 | Stark et al. | G05D 1/0027 701/301 |
| 2014/0263857 | A1* | 9/2014 | Huntimer | B61L 29/246 246/122 R |
| 2015/0060608 | A1* | 3/2015 | Carlson | B61L 27/0077 246/122 R |
| 2018/0225975 | A1* | 8/2018 | Park | G05D 1/0293 |
| 2019/0072981 | A1* | 3/2019 | Bresson et al. | B61L 25/025 |

\* cited by examiner

VEHICLE COLLISION AVOIDANCE SYSTEM

CROSS-REFERENCE TO RELATED APPLICATIONS

This application claims priority to U.S. Provisional Application No. 62/521,698, which was filed 19 Jun. 2017, and the entire disclosure of which is incorporated by reference herein.

FIELD

The subject matter described herein relates to control systems for one or more rail vehicle systems.

BACKGROUND

Transportation systems can be formed from a complex network of routes with many vehicle systems concurrently moving on the routes. For example, many rail vehicles may move on various interconnected tracks. Safety systems are needed to avoid collisions between the vehicle systems. One such safety system are signals, such as track block signals, which become illuminated to indicate to approaching vehicle systems that an upcoming segment of a route is occupied or is not occupied. But, this type of safety system can require a clear line of sight from an operator position in the vehicle system to the signal. Signals often become obscured or placed in locations that do not allow for a line of sight at a long enough distance to allow an approaching vehicle system to slow or stop in time in an emergency situation.

BRIEF DESCRIPTION

In one embodiment, a rail vehicle collision avoidance system includes plural sensors configured to be separately disposed onboard different rail vehicles of separate rail vehicle systems. The sensors are configured to output signals representing individual movement indicative data that individually represents separate movements of the different rail vehicles. The system also includes one or more processors configured to obtain the movement indicative data of the rail vehicles from the sensors. The one or more processors also are configured to determine an identification of which of the rail vehicles are included in which of the separate vehicle systems based on the movement indicative data that are obtained. The one or more processors also are configured to identify a collision risk between two or more of the different rail vehicle systems based on the movement indicative data that are obtained and the identification of which of the rail vehicles are in which of the separate rail vehicle systems. The one or more processors also are configured to automatically change the movement of at least one of the rail vehicle systems responsive to identifying the collision risk.

In one embodiment, a method for avoiding collision between rail vehicle systems includes obtaining movement indicative data from plural sensors separately disposed onboard different rail vehicles of separate rail vehicle systems. The movement indicative data individually represents separate movements of the different rail vehicles. The method also includes determining an identification of which of the rail vehicles are included in which of the separate vehicle systems based on the movement indicative data that are obtained, identifying a collision risk between two or more of the different rail vehicle systems based on the movement indicative data that are obtained and the identification of which of the rail vehicles are in which of the separate rail vehicle systems, and automatically changing the movement of at least one of the rail vehicle systems responsive to identifying the collision risk.

In one embodiment, a rail vehicle collision avoidance system includes one or more sensors configured to generate movement indicative data that separately indicates individual movements of different rail vehicles included in separate rail vehicle systems. The system also includes one or more processors configured to determine an identification of which of the rail vehicles are included in which of the separate rail vehicle systems based on the movement indicative data that are obtained. The one or more processors also are configured to determine a sequential order of the rail vehicles in at least one of the separate rail vehicle systems based on the movement indicative data that are obtained.

BRIEF DESCRIPTION OF THE DRAWINGS

The present inventive subject matter will be better understood from reading the following description of non-limiting embodiments, with reference to the attached drawings, wherein below.

DETAILED DESCRIPTION

One or more embodiments of the inventive subject matter described herein provide collision avoidance systems and methods for determining data indicative of movements of vehicles in separate vehicle systems based on onboard sensor data, determining which vehicles are grouped together in a vehicle system based on this data, and determining whether two or more of the vehicle systems are moving toward a collision with each other. The system can operate independent of existing track circuit technologies or the positive train control system. The system can utilize existing digital models of the routes, such as those developed or used by energy management systems of the vehicle systems, in concert with location determination systems and optionally beacons to produce position and velocity vectors for each vehicle system traveling in a transportation system formed from a network of interconnected routes. These vectors can be shared among the vehicle systems such that each vehicle system has knowledge of nearby vehicle systems in the route network. The systems and methods can provide drivers, dispatchers, or the like, information based on vectors.

At least one technical effect provided by the systems and methods includes the ability to determine which vehicles are included in different vehicle systems based on locations, headings, and/or speeds of the vehicles, to determine which vehicle systems are headed toward a collision with each other based on the locations, headings, and/or speeds of the vehicles, and to automatically change movement of at least one of the vehicle systems to avoid or prevent the collision.

Figure 1:
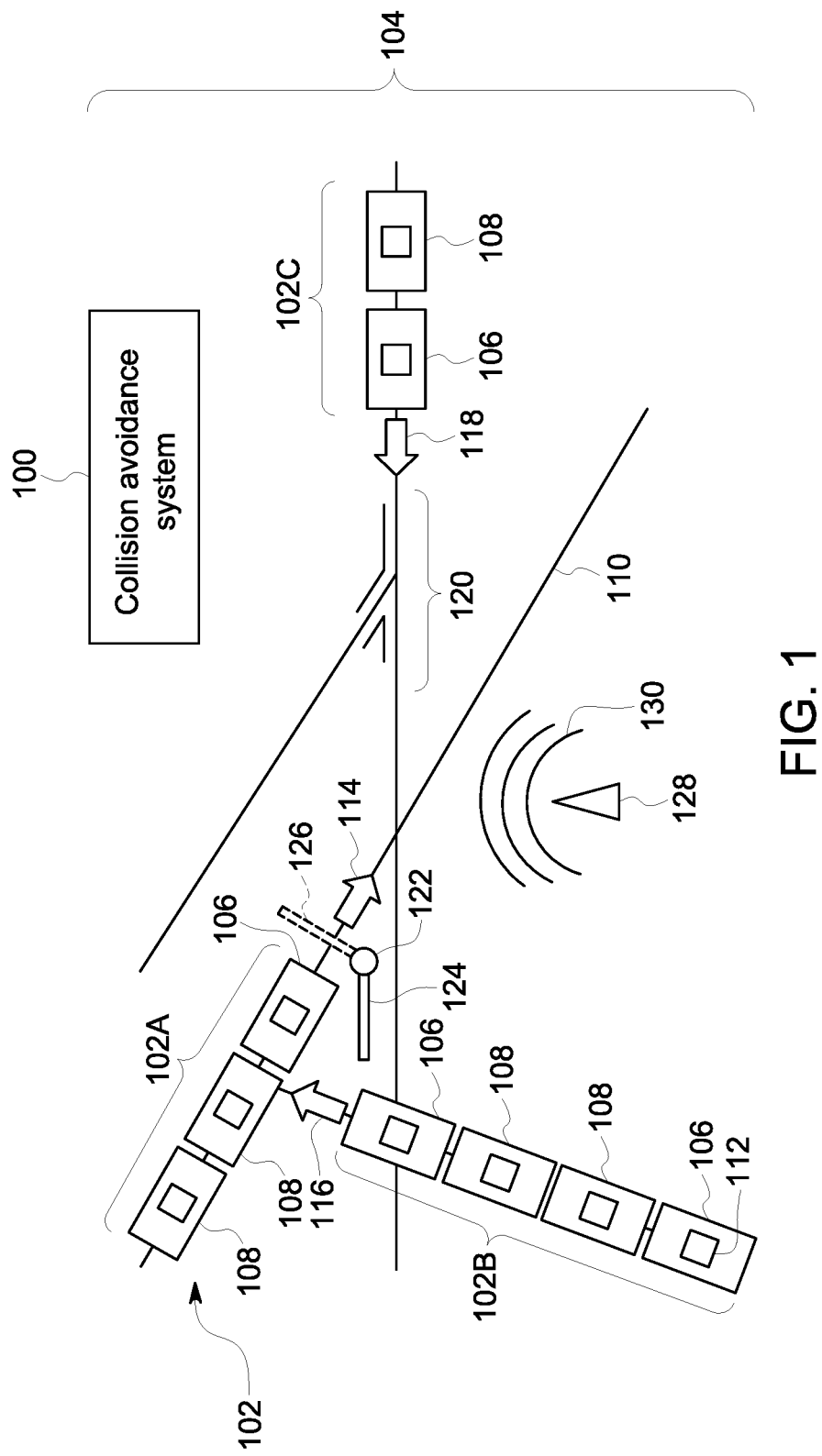
FIG. 1 illustrates a collision avoidance system operating in conjunction with several vehicle systems concurrently moving in a transportation network.

FIG. 1 illustrates a collision avoidance system 100 operating in conjunction with several vehicle systems 102 (e.g., vehicle systems 102A-C) concurrently moving in a transportation network 104. The vehicle systems 102 represent groups of one or more vehicles 106, 108 that are logically and/or mechanically coupled with each other. The vehicles can be logically coupled with each other in a vehicle system when the vehicles communicate with each other to coordinate movements of the vehicles with each other so that the vehicles in the vehicle system move together along one or more routes 110 of the transportation network 104, but not necessarily with the vehicles in the vehicle system 102 being mechanically coupled with each other. Optionally, the vehicles in a vehicle system 102 can be mechanically coupled with each other by couplers or other devices so that the vehicles in the vehicle system 102 move together along the routes 110.

The vehicles 106 represent propulsion-generating vehicles, such as locomotives, automobiles, trucks, mining vehicles, other off-highway vehicles (e.g., vehicles that are capable of self-propulsion, but that are not designed or are not legally permitted for travel on public roadways), marine vessels, or the like, that travel on one or more land-based or water-based routes 110. The routes 110 can represent roads, rails, tracks, highways, mining paths, waterways, or the like. The vehicles 108 represent non-propulsion-generating vehicles, such as rail cars, trailers, scoops, barges, or the like. The number and arrangement of the vehicles in the vehicle systems 102 shown in FIG. 1 are not limiting on all embodiments of the subject matter described herein. For example, a vehicle system 102 can be formed from a single vehicle or more than the number of vehicles shown in FIG. 1.

The transportation network 104 is formed from the interconnected routes 110, and optionally can include other devices, such as a switch 120 between two or more intersecting routes 110, a gate 122 that transitions between an open state 124 (to allow a vehicle system to pass) and a closed state 126 (to block passage of the vehicle system), a beacon 128 that wirelessly communicates a beacon signal, and the like.

In one embodiment, the collision avoidance system 100 obtains movement indicative data from vehicles 106, 108 that are included in the separate vehicle systems 120A-C. The movement indicative data are obtained from the sensors 112 that are disposed onboard the different vehicles 106 and/or 108. These sensors 112 can include location determining devices, such as global positioning system receivers, dead reckoning systems, wireless triangulation devices, or other devices that determine characteristics indicative of location and/or movement of the vehicles 106, 108. While the sensors 112 are shown in FIG. 1 as being disposed onboard each and every vehicle 106, 108 in each and every vehicle system 102A-C, alternatively, one or more of the vehicles 106 or 108 in one or more of the vehicle systems 102A-C may not include the sensor 112 onboard.

The movement indicative data can be obtained by the collision avoidance system 100 by the sensors 112 communicating the movement indicative data to the collision avoidance system 100. The movement indicative data can be wirelessly communicated as data signals from the sensors 112 and/or communication devices onboard the vehicle systems 102. For example, the sensors 112 can wirelessly communicate the movement indicative data, and/or the movement indicative data may be communicated from the sensors 112 to other transceiving circuitry, which may include one or more antennas, modems, or the like, onboard the vehicle systems 102. This transceiving circuitry can communicate the movement indicative data to the collision avoidance system 100. Optionally, the movement indicative data may be communicated at least partially through one or more wired connections between the sensors 112 and the collision avoidance system 100. For example, the sensors 112 and/or communication units onboard the vehicle systems 102 can communicate the movement indicative data as electric signals conducted through rails of the route 110 of the collision avoidance system 100.

The movement indicative data can include a variety of information that represents movement of the vehicles 106, 108. The movement indicative data can separately represent the individual movements of each of the vehicles 106, 108, even if the vehicles 106, 108 are included in the same vehicle system 102. Stated differently, movement indicative data can be separately provided for each vehicle 106, 108, regardless of whether the vehicle 106, 108 is included in a larger vehicle system 102 or not. In contrast to global positioning system information, tachometer information, positive train control information, or the like, that may be provided for an entire vehicle system 102 formed from several vehicles 106, 108, the movement indicative data can separately be provided for each individual vehicle 106, 108 or each propulsion-generating vehicle in a vehicle system 102. As described herein, this information can include speeds at which vehicles are moving, headings in which the vehicles are moving, locations of the vehicles, and the like. In one embodiment, the sensors 112 determine and communicate geographic locations (for example, longitude and latitude positions) to the collision avoidance system 100 as the movement indicative data.

As another example, the sensors 112 can communicate headings of the vehicles 106, 108 as the movement indicative data. For example, the sensors 112 can determine and communicate an angular difference between a direction in which the sensor 112 is moving relative to a designated or fixed direction (for example, true magnetic north or another direction), and communicate this angular difference to the collision avoidance system 100 as the heading.

As yet another example, the sensors 112 can determine the speeds of the vehicles 106, 108 is the movement indicative data. For example, the sensors 112 can communicate how rapidly the sensor 112 is moving relative to another location, such as the ground. In one embodiment, the movement indicative data communicated from the sensors 112 to the collision avoidance system 100 includes a combination of a location, a heading, and/or a moving speed of a vehicle 106, 108.

In one embodiment, the movement indicative data communicated to the collision avoidance system 100 by the sensors 112 may be based on a beacon signal 130 that is wirelessly emitted by the beacon 128. The beacon 128 can be disposed off-board any or all the vehicles or vehicle systems. For example, the beacon 128 can be a stationary device, assembly, or system that does not move relative to the routes. Alternatively, the beacon 128 can be mobile, such as by being disposed onboard one or more of the vehicles.

The sensors 112 can determine a relative location and/or heading of the sensor 112 to the location of the beacon 128 based on the beacon signal 130 that is received. This relative location and/or heading can be communicated from the sensors 112 to the collision avoidance system 100 as the movement indicative data. If the beacon 128 is mobile, the speed and/or heading of the beacon 128 can be included in the beacon signal 130. This can allow for the system 100 to determine the relative locations and/or headings of the sensors 112 relative to the beacon 128, such as by determining a vehicle vector that represents the movement of a sensor 112 onboard a vehicle, determining a beacon vector that represents the movement of the beacon 128, and combining the vehicle vector and the beacon vector to determine the relative movement of the sensor 112 to the moving beacon 128.

The collision avoidance system 100 can be disposed off-board the vehicle systems 102 (as shown in FIG. 1) or optionally can be disposed onboard at least one of the vehicle systems 102. For example, the movement indicative data can be communicated from the sensors 112 onboard the vehicles 106, 108 of the vehicle systems 102 to the collision avoidance system 100 disposed onboard at least one of the vehicle systems 102.

The collision avoidance system 100 obtains movement indicative data from the sensors 112 onboard various vehicles 106, 108 in the different vehicle systems 102, and determines which vehicles 106, 108 are included in the separate vehicle systems 102. The collision avoidance system 100 can determine which vehicles 106, 108 are in each of the separate vehicle systems 102 based on the movement indicative data received by collision avoidance system 100. In one embodiment, the collision avoidance system 100 does not have data indicating (or is otherwise not aware of) which vehicles 106, 108 are logically and/or mechanically coupled with each other in a group to travel together as a vehicle system. Instead, the collision avoidance system 100 may need to determine or approximate which vehicles 106, 108 are included in the same vehicle system based on the movement indicative data. As described herein, the collision avoidance system 100 can discern which vehicles 106, 108 are grouped together in the same vehicle system based on commonalities or common features of the movement indicative data associated with the different vehicles 106, 108.

For example, the vehicle system 102A may be moving along a route 110 in a direction represented by an arrow 114 in FIG. 1. The vehicle system 102B may be moving on another route 110 in a direction indicated by an arrow 116. The vehicle system 102C may be moving along another route 110 in the transportation network 104 in a direction indicated by an arrow 118. The collision avoidance system 100 can examine the movement indicative data reported by the sensors 112 onboard the vehicle systems 102A-C to determine which vehicles 106, 108 are logically and/or mechanically coupled with each other in the same vehicle system 102.

In the illustrated example, the geographic locations reported by the sensors 112 onboard a vehicle system 102 may be associated with each other by the collision avoidance system 100 as belonging to vehicles 106, 108 in the same vehicle system 102 because these geographic locations are closer together, are located along a path that is designated or previously known by the collision avoidance system 100 to fall or be on the same route 110, and/or the geographic locations change in a similar manner way as the vehicle system 102A. For example, the geographic locations reported by the sensor 112 onboard the vehicle 106 in the vehicle system 102A may move in a southeast direction (in the perspective of FIG. 1) along the arrow 114, as do the geographic locations reported by the sensors 112 onboard the vehicles 108 in the same vehicle system 102A.

Conversely, the locations reported by the sensors 112 onboard the vehicle system 102B may be farther from the geographic locations reported by the vehicles 106, 108 in the vehicle system 102A, may not fall on or be on the same route 110 as the geographic locations reported by the sensors 112 of the vehicle system 102A, and/or may not change in a similar manner or way as the geographic locations reported by the sensors 112 onboard the vehicle system 102A. The locations reported by the sensors 112 onboard the vehicle system 102C also may not indicate that these locations are associated with vehicles 106, 108 in the vehicle system 102A. Based on which locations are closer together, the collision avoidance system 100 can determine which vehicles 106, 108 are included in which vehicle systems 102, and can logically associate the vehicles 106, 108 with the corresponding vehicle systems 102 (e.g., by storing information on which vehicles 106, 108 are included in which vehicle system 102 in a computer readable memory).

As another example, the collision avoidance system 100 may examine the headings obtained from the sensors 112 onboard the different vehicles 106, 108 to determine which vehicles 106, 108 are included in the different vehicle systems 102. The different vehicle systems 102 may be traveling in different directions 114, 116, 118, as shown in FIG. 1. As a result, the headings obtained from the sensors 112 onboard the vehicles 106, 108 of the different vehicle systems 102 may be the same or closer to each other for the vehicles 106, 108 in the same vehicle system 102 relative to vehicles 106, 108 in other vehicle systems 102.

The headings reported by the sensors 112 of the vehicle system 102A may indicate movement along the heading indicated by the arrow 114, while the headings reported by the sensors 112 onboard other vehicle systems 102B, 102C may indicate different headings (for example, headings along the arrows 116, 118). Therefore, the collision avoidance system 100 may determine that the vehicles 106, 108 having sensors 112 that report headings along the direction of the arrow 114 are included in the same vehicle system 102A, the vehicles 106, 108 having the sensors 112 reporting the headings along the direction of the arrow 116 are included in the vehicle system 102B, and/or the vehicles 106, 108 having the sensors 112 that report the headings along the arrow 118 are included in the vehicle system 102C.

As another example, the vehicle systems 102 may be moving at different speeds of transportation network 104. The collision avoidance system 100 can receive moving speeds from the sensors 112 onboard the vehicles 106 of the different vehicle systems 102 and compare the speeds with each other. Those speeds that are closer to each other than other speeds may indicate that the vehicles 106, 108 having the sensors 112 that communicated the more similar speeds are included in the same vehicle system 102. For example, the speeds reported by the sensors 112 of the vehicles 106, 108 in the vehicle system 102A may be closer to each other the speeds reported by the sensors 112 onboard the vehicles 106, 108 in the vehicle system 102B. Based on this, the collision avoidance system 100 can determine that the vehicles 106, 108 having sensors 112 that reported the same or similar speeds are in the same vehicle system 102A.

The collision avoidance system 100 can determine velocity vectors of the different vehicle systems 102 based on the movement indicative data and/or determination of which vehicles 106, 108 are included in the different vehicle systems 102. The velocity vectors can be combinations of the headings of the vehicle systems 102 and the moving speeds of the vehicle systems 102. For example, a velocity vector for a vehicle system 102 can indicate both the heading of the vehicle system 102 and the speed of the vehicle system 102.

Optionally, the collision avoidance system 100 can determine which vehicle system 102 the different vehicles 106, 108 are in based on additional or different data provided by one or more other devices. In one embodiment, the collision avoidance system 100 may refer to a route database (shown in FIG. 2) to determine geographic locations of the routes 110 in the transportation network 104. The collision avoidance system 100 can compare the geographic locations, changes in the geographic locations, and/or headings reported by the sensors 112 to determine which locations, changes in locations, and/or headings coincide with geographic locations of the routes 110 stored in the route database. Those locations, changes in locations, and/or headings that coincide with a common or the same route 110 may be associated by the collision avoidance system 100 with the same vehicle system 102.

Optionally, the collision avoidance system 100 may examine multiple, different instances of movement indicative data to determine and/or verify which vehicles 106, 108 are in the different vehicle systems 102. For example, collision avoidance system 100 can determine that those sensors 112 that communicate geographic locations that are closer to each other the geographic locations reported by other sensors 112, the headings reported by the sensors 112 that are more aligned or closer to aligned with a common direction, and/or those sensors 112 that communicate moving speeds that are closer to each other than speeds reported by other sensors 112, can indicate that those sensors 112 communicating the closer or more similar locations, headings, and/or speeds are onboard vehicles 106, 108 in the same vehicle system 102.

While several examples are provided of different information that may be examined by the collision avoidance system 100 to determine which vehicles 106, 108 are included in the same vehicle system, the collision avoidance system 100 can examine any of a variety of different combinations of some or all of these different types of information to determine which vehicles 106, 108 are included in the same vehicle system in one embodiment.

The collision avoidance system 100 can determine a collision risk between two or more vehicle systems 102 based on the movement indicative data. For example, the collision avoidance system 100 can determine which vehicles 106, 108 are in the different vehicle systems 102, and can determine the directions of travel and locations of the different vehicle systems 102 based on the movement indicative data. If two or more of the vehicle systems 102 are moving toward a common location in the transportation network 104 (for example, the same intersection between two or more routes 110, the same location on a route 110, or the like), the collision avoidance system 100 can determine that these vehicle systems 102 are at risk for collision with each other.

With respect to the example shown in FIG. 1, the collision avoidance system 100 can determine that the vehicle systems 102A, 102B are at urgent collision risk due to the geographic locations reported by the sensors 112 of the vehicle system 102A, the geographic locations reported by the sensors 112 onboard the vehicle system 102B, and/or the headings or changes in geographic locations reported by the sensors 112 reported by the vehicle system 102B indicate that the vehicle system 102B is headed in the direction of the arrow 116 toward the vehicle system 102A and that the vehicle system 102B is close to the vehicle system 102A. As another example, the collision avoidance system 100 may examine the geographic locations, changes in geographic locations, and/or headings reported by the sensors 112 onboard the vehicle systems 102A, 102C to determine that the vehicle systems 102A, 102C are at risk of a collision.

The collision avoidance system 100 can communicate the determination of which vehicles 106, 108 are in the different vehicle systems 102, the locations of the vehicles 106, 108 and/or vehicle systems 102, the headings of the vehicles 106, 108 and/or vehicle systems 102, the moving speeds of the vehicles 106, 108 and/or vehicle systems 102 to the vehicle systems 102, and/or the velocity vectors of the vehicle systems 102 to the vehicle systems 102. The collision avoidance system 100 can communicate some or all this information to control systems or controllers onboard the vehicle systems 102 so that the control systems or controllers can determine whether there is any collision risk for the vehicle system 102 of the control system or controller. The control system or controller of a vehicle system 102 can include hardware circuitry that includes and/or is connected with one or more processors (e.g., one or more microprocessors, field programmable gate arrays, and/or integrated circuits) that controls at least some operations of the vehicle system 102 (e.g., by controlling motors, engines, brakes, or the like automatically and/or under the direction of an operator).

The collision avoidance system 100 can determine the risk of collision between two or more vehicle systems 102 independent of one or more devices or systems other than the sensors 112 onboard the vehicles 106 and/or 108. For example, the collision avoidance system 100 can determine which vehicles 106, 108 are included in the different vehicle systems 102 and whether two or more of the vehicle systems 102 are headed toward a collision without input, information, or data from a positive train control system, from an illuminated signal in the transportation network 104, from a track circuit monitoring system, or the like.

A positive train control system can include a speed control unit on a vehicle and one or more communication devices that dynamically inform the speed control unit of changing route or signal conditions. The positive train control system optionally can include an on-board navigation system and route profile database that are used to enforce fixed speed limits based on the location of the vehicle. A bi-directional data link can be used to inform signaling equipment of the presence of the vehicle. The system can use a fixed signaling infrastructure such as coded track circuits and wireless transponders to communicate with the onboard speed control unit. Or, wireless data radios spread out along the line can be used to transmit the dynamic information. The wireless implementation also allows for the train to transmit locations to the signaling system. The onboard equipment continually calculates the current speed relative to a speed target some distance away governed by a braking curve. If the train risks not being able to slow to the speed target given the braking curve, the brakes are automatically applied and the train is immediately slowed.

The speed targets are updated by information regarding fixed and dynamic speed limits determined by the track profile and signaling system. Some positive train control implementations also use the speed control unit to store a database of track profiles attached to some sort of navigation system. The unit keeps track of the train's position along the rail line and automatically enforces any speed restrictions as well as the authorized speed. Temporary speed restrictions can be updated before the train departs its terminal or via wireless data links. The track data can also be used to calculate braking curves based on the grade profile. The navigation system can use fixed track beacons or differential global positioning system stations combined with wheel rotation to accurately determine the train's location on the line within a few feet.

The track circuit monitoring system can detect the presence of a vehicle 106, 108 or vehicle system 102 on a segment of a route 110 by injecting an electric signal into a rail of the route 110 and detecting a short circuit or other change in a circuit that is at least partially formed by the rail in the route 110. Such a system can include one or more first conductive bodies that are coupled with at least one rail or other conductive portion of the route 110, one or more second conductive bodies that also are coupled with the same or different rail (or other conductive portion of the route), a power supply that provides electric current to at least one of these conductive bodies, and one or more sensors. The first or second bodies are used to inject electric current into the route, and the other of the second or first bodies are used to sense a characteristic of the route based on the injected current, such as the resistance or impedance of the route, the voltage or current conducted through the route, or the like. Changes in the current can indicate the presence of a vehicle system on a section of the route between the first and second conductive bodies. For example, the wheels and axle of a vehicle can create a short circuit in the circuit formed by the conductive portion of the route and the first and second conductive bodies. This short circuit can cause the voltage or current sensed by the first or second conductive bodies to sharply decrease or to not be detected.

Responsive to determining such a collision risk, the collision avoidance system 100 may implement one or more responsive actions. In one embodiment, the collision avoidance system 100 automatically changes movement of at least one of the vehicle systems 102 that are part of the collision risk. For example, the collision avoidance system 100 can communicate a control signal to a controller or propulsion system or brake system of one or more of the propulsion-generating vehicles 106 in the vehicle system 102B to instruct the controller, propulsion system, and/or brake system to automatically slow or stop movement of the vehicle system 102B to avoid collision with the vehicle system 102A. Similarly, the collision avoidance system 100 can communicate a control signal to one or more of the vehicle systems 102A, 102C to automatically slow or stop movement of the vehicle system 102 a and/or the vehicle system 102C to prevent a collision between the vehicle systems 102A, 102C.

In another example, the collision avoidance system 100 can automatically change movement of one or more of the vehicle systems 102 by communicating a signal to the switch 120 (or to a wayside device that controls the switch 120). The signal can instruct the switch 120 to change positions or states such that a vehicle system 102 traveling over or through the switch 120 is directed onto a different route 110 (e.g., relative to the route 110 that the vehicle system 102 would have traveled onto prior to changing the position or state of the switch 120). This can avoid a collision between vehicle systems 102 by changing which routes 110 at least one of the vehicle systems 102 is traveling on.

In another example, the collision avoidance system 100 can automatically change movement of one or more of the vehicle systems 102 by communicating a signal to the gate 122 (or to a wayside device that controls the gate 122). The signal can instruct the gate 122 to change positions or states such that a vehicle system 102 is prevented from continued travel over the route 110 (e.g., by closing the gate 122) or such that the vehicle system 102 is allowed to continue traveling over the route 110 (e.g., by opening the gate 122). This can avoid a collision between vehicle systems 102 by preventing continued movement of a vehicle system 102 toward a potential collision or by allowing a vehicle system 102 to move out of the way of another vehicle system 102.

In one embodiment, the collision avoidance system 100 can check or verify the accuracy of a manifest of a vehicle system 102 based on the movement indicative data that are obtained. The manifest can indicate which vehicles 106 and/or 108 are to be included in a vehicle system 102 for a trip of the vehicle system 102. The movement indicative data that is communicated to the collision avoidance system 100 can be associated with different vehicles 106, 108. For example, identification data that identifies the vehicle 106, 108 from which the movement indicative data is being communicated from the sensor 112 can be communicated within and/or in addition to the movement indicative data. The collision avoidance system 100 can examine the received data and determine which vehicles 106, 108 are included in the various vehicle systems 102 (as described above), and can compare this determined information with the manifest. Differences between the manifest and the determination of which vehicles 106, 108 are included in the vehicle system 102 can be communicated to the vehicle system 102 and/or to another location (e.g., a scheduling facility, a dispatch facility, etc.).

The collision avoidance system 100 can determine a sequential order in which the vehicles 106 and/or 108 are arranged in a vehicle system 102 based on the movement indicative data. The sequential order of the vehicles 106 and/or 108 in a vehicle system 102 is the relative positions of the vehicles 106 and/or 108 in the vehicle system 102. For example, the leading vehicle 106, 108 along a direction of movement in the vehicle system 102 can be first in the sequential order, the vehicle 106, 108 behind the leading vehicle 106, 108 along the direction of movement in the same vehicle system 102 can be second in the sequential order, and so on. The collision avoidance system 100 can examine the movement indicative data received by the vehicles 106, 108 and compare the movement indicative data with locations or layouts of one or more routes 110 in the transportation network 104. The collision avoidance system 100 can determine the sequential order of the vehicles 106, 108 in a vehicle system 102 by comparing the locations of the vehicles 106, 108 with the locations of the routes 110. The relative positions of the vehicles 106, 108 on the route 110 indicates the sequential order of the vehicles 106, 108 to the collision avoidance system 100. In one example, the collision avoidance system 100 compares the locations of the vehicles 106, 108 with each other while the vehicles 106, 108 are on a curved segment of the route 110 to determine the sequential order. The collision avoidance system 100 can compare the vehicle locations while the vehicles 106, 108 are on the curved route segment to more clearly differentiate between the locations of the vehicles 106, 108. For example, the sequential order of two or more vehicles 106, 108 may be more likely to be incorrect (e.g., mixed up) when the vehicles 106, 108 are on a straight segment of the route 110 than when the vehicles 106, 108 are on a curved segment of the route 110.

Figure 2:
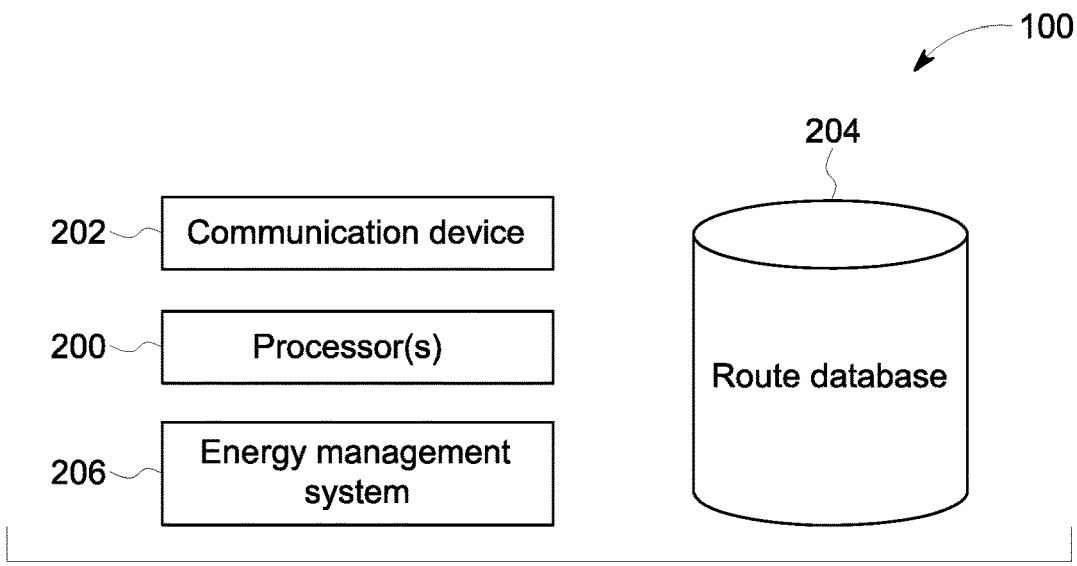
FIG. 2 illustrates one example of the collision avoidance system shown in FIG. 1.

FIG. 2 illustrates one example of the collision avoidance system 100 shown in FIG. 1. Some or all components of the collision avoidance system 100 can be disposed off-board the vehicle systems 102 shown in FIG. 1. For example, the collision avoidance system 100 can be partially or entirely disposed at a dispatch facility, a scheduling facility, vehicle yard, or the like. Optionally, some or all components of the collision avoidance system 100 may be disposed onboard one or more of the vehicle systems 102.

The collision avoidance system 100 includes hardware circuitry that includes and/or is coupled with one or more processors 200 (for example, one or more microprocessors, field programmable gate arrays, and/or integrated circuits), that perform the operations described herein in connection with the collision avoidance system 100. For example, the processors 200 may obtain the movement indicative data from the sensors 112 shown in FIG. 1, examine and/or compare the movement indicative data received from the sensors 112, determine which vehicle systems 102 include the various vehicles 106, 108, identify or determine collision risks between vehicle systems 102, and the like.

The collision avoidance system 100 can include a communication device 202. The communication device 202 represents hardware transceiving circuitry that can communicate data signals with one or more other devices outside of the collision avoidance system 100. For example, the communication device 202 can represent hardware circuitry that includes and/or is connected with one or more antennas, modems, or the like, for communicating with the sensors 112, control systems or controllers of the vehicle systems 102, and the like.

In one embodiment, the collision avoidance system 100 includes and/or has access to a route database 204. As described above, the route database 204 can include data indicative of geographic locations, layouts, or the like, of the routes 110 in the transportation network 104 shown in FIG. 1. The route database 204 can be accessed by the processors 200 to determine which vehicles 106, 108 are in the different vehicle systems 102 and/or which vehicle systems 102 are at risk with colliding with each other based on the movement indicative data received by the processors 200. The route database 204 can represent a computer readable medium, such as a computer hard drive, flash drive, optical disk, or the like.

Optionally, the collision avoidance system 100 may include and/or have access to an energy management system 206. The energy management system 206 can represent hardware circuitry that includes and/or is connected with one or more processors that designate operational settings of one or more vehicle systems 102 at one or more of different locations along the routes 110, different times, and/or different distances along the routes 110. The operational settings that are designated by the energy management system 206 can include throttle settings, speeds, brake settings, accelerations, or the like. The energy management system 206 can designate these operational settings to control or limit the amount of fuel consumed, noise generated, and/or emissions generated by the vehicle system 102. The energy management system 206 can designate these operational settings such that the vehicle system 102 consumes less fuel, generates less noise, and/or generates fewer emissions than the vehicle system 102 traveling according to other operational settings, such as the vehicle system 102 traveling at an upper speed limit or limits of the routes 110.

The energy management system 206 can include a computer readable medium that stores data indicative of the routes 110. For example, the energy management system 206 can include and/or have access to a database of route information that is similar to the route database 204. The processors 200 of the collision avoidance system 100 can access this route information from the energy management system 206 to determine which vehicles 106, 108 are included in the different vehicle systems 102, and/or which vehicle systems 102 are the risk of colliding with each other, as described herein.

Figure 3:
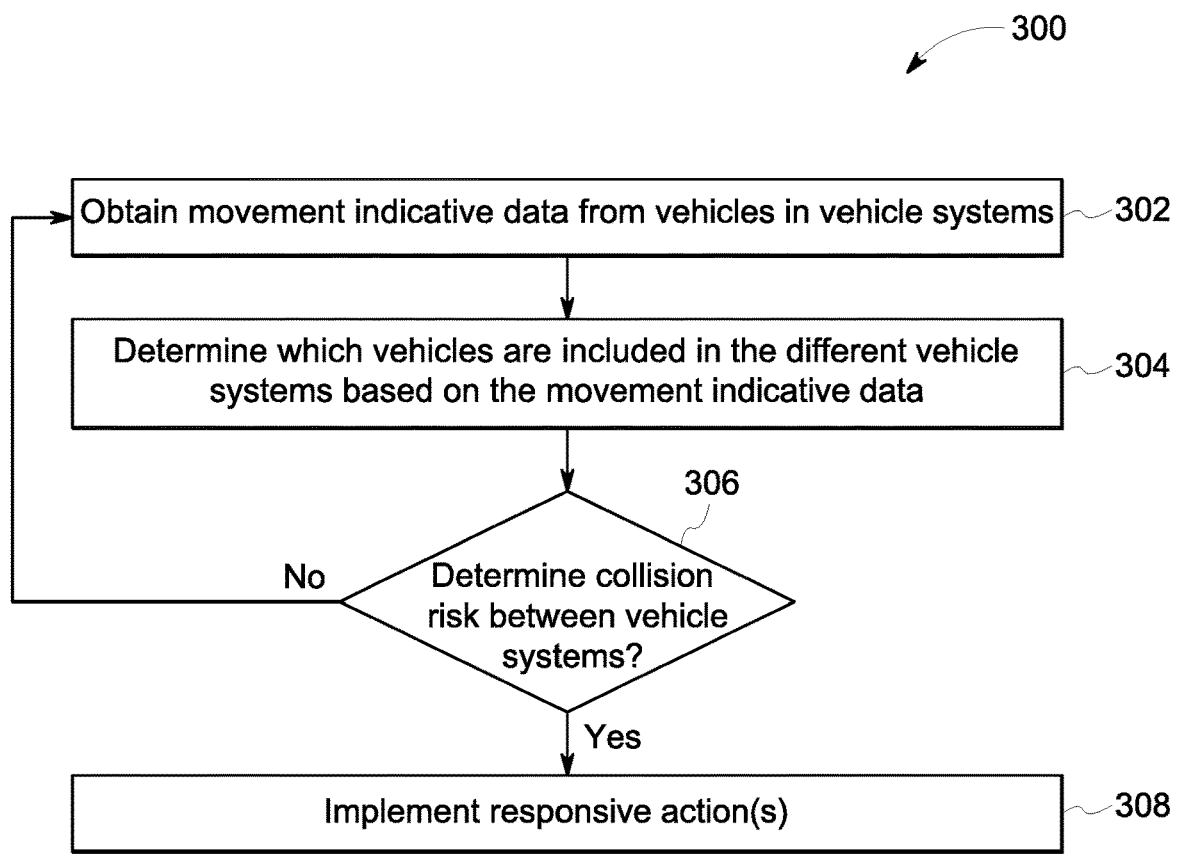
FIG. 3 illustrates a flowchart of one embodiment of a method for determining risks of collision between vehicle systems traveling in a transportation network.

FIG. 3 illustrates a flowchart of one embodiment of a method 300 for determining risks of collision between vehicle systems traveling in a transportation network. The method 300 represent operations performed by the collision avoidance system 100 described herein. For example, the operations described in connection with the method 300 can represent operations performed by the collision avoidance system 100 under the direction of one or more software applications instructing the processors 200. Optionally, a person of ordinary skill in the art may use the operations described in connection with the flowchart of the method 300 to write one or more such software applications.

At 302, movement indicative data is obtained from vehicles in vehicle systems in the transportation network. For example, geographic locations, headings, and/or moving speeds of different vehicles traveling in different vehicle systems may be obtained. This movement indicative data can be obtained by sensors on board the vehicles.

At 304, a determination is made as to which vehicles are included in the different vehicle systems. This determination includes associating the vehicles from which the movement indicative data was obtained with different vehicle systems based on the movement indicative data. This determination may be performed without prior knowledge of which vehicle systems include the different vehicles. As described above, the determination of which vehicles are included in the different vehicle systems may be completed by comparing the geographic locations of the vehicles with each other, by comparing changes in the geographic data of the vehicles with each other, by comparing headings of the vehicles, and/or by comparing moving speeds of the vehicles with each other. In one embodiment, geographic locations or layouts of routes in the transportation network also may be used to determine which vehicles are included in the different vehicle systems.

At 306, a determination is made as to whether there is a collision risk between vehicle systems. This determination to be completed using the movement indicative data to determine where the different vehicle systems are located and whether two or more of the vehicle systems are headed toward each other or toward a common location. If a risk of collision is identified between two or more vehicles, flow of the method 300 can proceed toward 308. If no risk of collision is identified between vehicle systems, and flow the method 300 can return toward 302. Optionally, the method 300 can terminate.

At 308, one or more responsive actions are implemented. As described above, these responsive actions can include notifying an operator on board one or more of the vehicle systems of the collision risk, instructing such an operator to slow or stop movement of one of the vehicle systems, instructing the operator to change which route or routes are being traveled upon by one or more of the vehicle systems, communicating a data signal to automatically slow or stop movement of at least one of the vehicle systems, communicating a control signal to at least one of the vehicle systems to change which route is being traveled upon, communicating a signal to a switch or gate to change movement of at least one of the vehicle systems, or the like. Flow the method 300 may terminate or may return toward 302 or another operation.

One embodiment of the systems and methods described herein can obtain movement indicative data of plural vehicles that are included in separate vehicle systems. The movement indicative data can be obtained from sensors onboard the vehicles. An identification of which of the vehicles are included in the separate vehicle systems is determined based on the movement indicative data that are obtained. A collision risk between two or more vehicle systems of the separate vehicle systems is determined based on the movement indicative data that are obtained and the identification of which of the vehicles are in the separate vehicle systems. The movement indicative data can include locations, headings, and moving speeds of the vehicles, and the collision risk can be determined based on a correlation of the locations, headings, and moving speeds to a route database of routes available to the vehicles. The collision risk can be determined independent of input from a track circuit monitoring system and independent of input from a positive train control system. Communication with at least one of propulsion systems or energy management systems of the vehicles systems can be performed to automatically change movement of at least one of the two or more vehicle systems responsive to determining the collision risk.

In one embodiment, a system includes one or more processors configured to obtain movement indicative data of plural vehicles included in separate vehicle systems. The movement indicative data can be obtained from sensors onboard the vehicles. The one or more processors also can be configured to determine an identification of which of the vehicles are included in the separate vehicle systems based on the movement indicative data that are obtained and to determine a collision risk between two or more vehicle systems of the separate vehicle systems based on the movement indicative data that are obtained and the identification of which of the vehicles are in the separate vehicle systems. The one or more processors also can be configured to automatically change movement of at least one of the two or more vehicle systems responsive to determining the collision risk.

In one example, the one or more processors are configured to obtain locations of the vehicles as the movement indicative data.

In one example, the one or more processors are configured to obtain headings of the vehicles as the movement indicative data.

In one example, the one or more processors are configured to obtain moving speeds of the vehicles as the movement indicative data.

In one example, the one or more processors are configured to obtain one or more of locations, headings, or moving speeds of the vehicles as the movement indicative data.

In one example, the one or more processors are configured to determine the collision risk independent of input from a track circuit monitoring system or a positive train control system.

In one example, the one or more processors are configured to determine which of the vehicles are included in each of the separate vehicle systems also is based on a route database storing data on locations of routes.

In one example, the one or more processors are configured to receive a beacon signal sent by a beacon device at a designated location. The one or more processors are configured to determine the identification of which of the vehicles are included in each of the separate vehicle systems based also on receipt of the beacon signal.

In one example, the one or more processors are configured to communicate the movement indicative data that are obtained and the identification of which of the vehicles are in the separate vehicle systems to the separate vehicle systems.

In one example, the one or more processors are configured to determine velocity vectors of the vehicle systems based on the movement indicative data that are obtained and the identification of which of the vehicles are in the separate vehicle systems.

In one example, the one or more processors are configured to communicate the velocity vectors to the separate vehicle systems.

In one example, the one or more processors are configured to determine the collision risk responsive to the movement indicative data that are obtained for the vehicles in the separate vehicle systems indicating that the separate vehicle systems are traveling toward a common location.

In one example, the one or more processors are configured to automatically change the movement of at least one of the two or more vehicle systems by one or more of automatically stopping or slowing movement of at least one of the two or more vehicle systems.

In one example, the one or more processors are configured to automatically change the movement of at least one of the two or more vehicle systems by generating one or more of an audible notification, visual notification, or tactile notification that instructs an operator to change the movement of at least one of the two or more vehicle systems.

In one example, the one or more processors are configured to automatically change the movement of at least one of the two or more vehicle systems by changing a position or state of a switch at an intersection between two or more routes.

In one example, the one or more processors are configured to automatically change the movement of at least one of the two or more vehicle systems by changing a position or state of a gate of a route.

In one example, at least one of the separate vehicle systems includes one or more propulsion-generating vehicles and one or more non-propulsion-generating vehicles. The one or more processors are configured to obtain at least a portion of the movement indicative data from the sensor onboard the one or more non-propulsion-generating vehicles.

In one example, the one or more processors are configured to obtain the movement indicative data from global positioning system receivers as the sensors.

In one example, the one or more processors are configured to be disposed onboard at least one of the separate vehicle systems.

In one example, the one or more processors are configured to be disposed off-board the separate vehicle systems.

In one example, the one or more processors are configured to determine an accuracy of a manifest of at least one of the separate vehicle systems based on the movement indicative data that are obtained.

In one example, the one or more processors are configured to determine a sequential order of the vehicles in at least one of the separate vehicle systems based on the movement indicative data that are obtained.

In one example, the one or more processors are configured to determine the sequential order of the vehicles based on the movement indicative data that represents movement of the vehicles along a curved segment of a route.

In an embodiment, a system (e.g., rail vehicle collision avoidance system) includes plural sensors configured to be separately disposed onboard different rail vehicles of separate rail vehicle systems. The sensors are configured to output signals representing individual movement indicative data that individually represents separate movements of the different rail vehicles. The system also includes one or more processors configured to obtain the movement indicative data that individually represents separate movements of the rail vehicles from the sensors. The one or more processors also are configured to determine an identification of which of the rail vehicles are included in which of the separate vehicle systems based on the movement indicative data that are obtained. The one or more processors also are configured to identify a collision risk between two or more of the different rail vehicle systems based on the movement indicative data that are obtained and the identification of which of the rail vehicles are in which of the separate rail vehicle systems. The one or more processors also are configured to automatically change the movement of at least one of the rail vehicle systems responsive to identifying the collision risk.

In an embodiment, a system (e.g., rail vehicle collision avoidance system) includes plural sensors, one or more processors, and a communication network (e.g., wireless transmitter) that communicatively couples the sensors and one or more processors. The sensors are separately disposed onboard different rail vehicles of separate rail vehicle systems. The sensors are configured to output signals representing individual movement indicative data that individually represents separate movements of the different rail vehicles. The one or more processors are configured to obtain (e.g., receive over the communication network) the movement indicative data that individually represents separate movements of the rail vehicles from the sensors. The one or more processors also are configured to determine an identification of which of the rail vehicles are included in which of the separate vehicle systems based on the movement indicative data that are obtained. The one or more processors also are configured to identify a collision risk between two or more of the different rail vehicle systems based on the movement indicative data that are obtained and the identification of which of the rail vehicles are in which of the separate rail vehicle systems. The one or more processors also are configured to automatically change the movement of at least one of the rail vehicle systems responsive to identifying the collision risk.

In one embodiment, a method includes obtaining movement indicative data of plural vehicles included in separate vehicle systems. The movement indicative data can be obtained from sensors onboard the vehicles. The method also includes determining an identification of which of the vehicles are included in the separate vehicle systems based on the movement indicative data that are obtained, determining a collision risk between two or more vehicle systems of the separate vehicle systems based on the movement indicative data that are obtained and the identification of which of the vehicles are in the separate vehicle systems, and automatically changing movement of at least one of the two or more vehicle systems responsive to determining the collision risk. The method may be carried out by one or processors that are configured for direct or indirect communications with the sensors.

In one example, the movement indicative data that are obtained include locations of the vehicles.

In one example, the movement indicative data that are obtained include headings of the vehicles.

In one example, the movement indicative data that are obtained include moving speeds of the vehicles.

In one example, the movement indicative data that are obtained include two or more of locations, headings, or moving speeds of the vehicles.

In one example, the collision risk is determined independent of input from a track circuit monitoring system or a positive train control system.

In one example, determining which of the vehicles are included in each of the separate vehicle systems also is based on a route database storing data on locations of routes.

In one example, the method also includes receiving a beacon signal sent by a beacon device at a designated location, and determining the identification of which of the vehicles are included in each of the separate vehicle systems also is based on receipt of the beacon signal.

In one example, the method also includes communicating the movement indicative data that are obtained and the identification of which of the vehicles are in the separate vehicle systems to the separate vehicle systems.

In one example, the method also includes determining velocity vectors of the vehicle systems based on the movement indicative data that are obtained and the identification of which of the vehicles are in the separate vehicle systems.

In one example, the method also includes communicating the velocity vectors to the separate vehicle systems.

In one example, the collision risk is determined responsive to the movement indicative data that are obtained for the vehicles in the separate vehicle systems indicating that the separate vehicle systems are traveling toward a common location.

In one example, automatically changing the movement of at least one of the two or more vehicle systems includes one or more of automatically stopping or slowing movement of at least one of the two or more vehicle systems.

In one example, automatically changing the movement of at least one of the two or more vehicle systems includes generating one or more of an audible notification, visual notification, or tactile notification that instructs an operator to change the movement of at least one of the two or more vehicle systems.

In one example, automatically changing the movement of at least one of the two or more vehicle systems includes changing a position or state of a switch at an intersection between two or more routes.

In one example, automatically changing the movement of at least one of the two or more vehicle systems includes changing a position or state of a gate of a route.

In one example, at least one of the separate vehicle systems includes one or more propulsion-generating vehicles and one or more non-propulsion-generating vehicles. At least a portion of the movement indicative data that is obtained, is obtained from the sensor onboard the one or more non-propulsion-generating vehicles.

In one example, the movement indicative data are obtained from global positioning system receivers as the sensors.

In one example, obtaining the movement indicative data of plural vehicles, determining the identification of which of the vehicles are included in the separate vehicle systems, and determining the collision risk are performed onboard at least one of the separate vehicle systems.

In one example, obtaining the movement indicative data of plural vehicles, determining the identification of which of the vehicles are included in the separate vehicle systems, and determining the collision risk are performed off-board the separate vehicle systems.

In one example, the method also includes determining an accuracy of a manifest of at least one of the separate vehicle systems based on the movement indicative data that are obtained.

In one example, the method also includes determining a sequential order of the vehicles in at least one of the separate vehicle systems based on the movement indicative data that are obtained.

In one example, the sequential order of the vehicles that is determined is based on the movement indicative data that represents movement of the vehicles along a curved segment of a route.

In one embodiment, a method includes obtaining movement indicative data of plural vehicles included in separate vehicle systems. The movement indicative data can be obtained from sensors onboard the vehicles. The method also includes determining an identification of which of the vehicles are included in the separate vehicle systems based on the movement indicative data that are obtained, and determining a sequential order of the vehicles in at least one of the separate vehicle systems based on the movement indicative data that are obtained.

In one example, the sequential order of the vehicles that is determined is based on the movement indicative data that represents movement of the vehicles along a curved segment of a route.

In one example, the movement indicative data that are obtained include locations of the vehicles.

In one example, the movement indicative data that are obtained include headings of the vehicles.

In one example, the movement indicative data that are obtained include moving speeds of the vehicles.

In one example, the movement indicative data that are obtained include two or more of locations, headings, or moving speeds of the vehicles.

In one example, determining which of the vehicles are included in each of the separate vehicle systems also is based on a route database storing data on locations of routes.

In one example, the method also includes receiving a beacon signal sent by a beacon device at a designated location. Determining the identification of which of the vehicles are included in each of the separate vehicle systems also can be based on receipt of the beacon signal.

In one example, the method also includes communicating the movement indicative data that are obtained and the identification of which of the vehicles are in the separate vehicle systems to the separate vehicle systems.

In one example, the method also includes determining velocity vectors of the vehicle systems based on the movement indicative data that are obtained and the identification of which of the vehicles are in the separate vehicle systems.

In one example, the method also includes communicating the velocity vectors to the separate vehicle systems.

In one example, at least one of the separate vehicle systems includes one or more propulsion-generating vehicles and one or more non-propulsion-generating vehicles. At least a portion of the movement indicative data that is obtained, can be obtained from the sensor onboard the one or more non-propulsion-generating vehicles.

In one example, the movement indicative data are obtained from global positioning system receivers as the sensors.

In one example, obtaining the movement indicative data of plural vehicles, determining the identification of which of the vehicles are included in the separate vehicle systems, and determining the sequential order are performed onboard at least one of the separate vehicle systems.

In one example, obtaining the movement indicative data of plural vehicles, determining the identification of which of the vehicles are included in the separate vehicle systems, and determining the sequential order are performed off-board the separate vehicle systems.

In one example, the method also includes determining an accuracy of a manifest of at least one of the separate vehicle systems based on the movement indicative data that are obtained.

In one example, the method also includes determining a collision risk between two or more vehicle systems of the separate vehicle systems based on the movement indicative data that are obtained and the identification of which of the vehicles are in the separate vehicle systems, and automatically changing movement of at least one of the two or more vehicle systems responsive to determining the collision risk.

In one example, the collision risk is determined independent of input from a track circuit monitoring system or a positive train control system.

In one example, the collision risk is determined responsive to the movement indicative data that are obtained for the vehicles in the separate vehicle systems indicating that the separate vehicle systems are traveling toward a common location.

In one example, automatically changing the movement of at least one of the two or more vehicle systems includes one or more of automatically stopping or slowing movement of at least one of the two or more vehicle systems.

In one example, automatically changing the movement of at least one of the two or more vehicle systems includes generating one or more of an audible notification, visual notification, or tactile notification that instructs an operator to change the movement of at least one of the two or more vehicle systems.

In one example, automatically changing the movement of at least one of the two or more vehicle systems includes changing a position or state of a switch at an intersection between two or more routes.

In one example, automatically changing the movement of at least one of the two or more vehicle systems includes changing a position or state of a gate of a route.

As used herein, an element or step recited in the singular and proceeded with the word "a" or "an" should be understood as not excluding plural of said elements or steps, unless such exclusion is explicitly stated. Furthermore, references to "one embodiment" of the presently described subject matter are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the subject matter set forth herein without departing from its scope. While the dimensions and types of materials described herein are intended to define the parameters of the disclosed subject matter, they are by no means limiting and are exemplary embodiments. Many other embodiments will be apparent to those of skill in the art upon reviewing the above description. The scope of the subject matter described herein should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose several embodiments of the subject matter set forth herein, including the best mode, and also to enable a person of ordinary skill in the art to practice the embodiments of disclosed subject matter, including making and using the devices or systems and performing the methods. The patentable scope of the subject matter described herein is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

What is claimed is:

1. A vehicle collision avoidance system comprising:
one or more processors configured to obtain output signals from plural sensors configured to be separately disposed onboard different vehicles of separate vehicle systems, the output signals representing individual movement indicative data that individually represents separate movements of the different vehicles,
wherein the one or more processors also are configured to determine an identification of which of the vehicles are included in which of the separate vehicle systems based on the movement indicative data that are obtained,
wherein the one or more processors also are configured to identify a collision risk between two or more of the different vehicle systems based on the movement indicative data that are obtained and the identification of which of the vehicles are in which of the separate vehicle systems,
wherein the one or more processors also are configured to automatically change the movement of at least one of the vehicle systems responsive to identifying the collision risk;
wherein the one or more processors are configured to determine a sequential order of the vehicles in at least one of the separate vehicle systems based on the movement indicative data that are obtained.

2. The vehicle collision avoidance system of claim 1, wherein the one or more processors are configured to obtain one or more of geographic locations, headings, or moving speeds of the vehicles as the movement indicative data.

3. The vehicle collision avoidance system of claim 1, wherein the one or more processors are configured to identify the collision risk independent of input from a route monitoring system or a positive vehicle control system.

4. The vehicle collision avoidance system of claim 1, wherein the one or more processors are configured to determine which of the vehicles are included in each of the separate vehicle systems based also on a route database storing data on locations of routes.

5. The vehicle collision avoidance system of claim 1, wherein the one or more processors are configured to receive a beacon signal sent by a beacon device at a designated location, wherein the one or more processors are configured to determine the identification of which of the vehicles are included in each of the separate vehicle systems also based on receipt of the beacon signal.

6. The vehicle collision avoidance system of claim 1, wherein the one or more processors are configured to identify the collision risk responsive to the movement indicative data that are obtained for the vehicles in the separate vehicle systems indicating that the separate vehicle systems are traveling toward a common location.

7. The vehicle collision avoidance system of claim 1, wherein at least one of the separate vehicle systems includes one or more propulsion-generating vehicles and one or more non-propulsion-generating vehicles, and wherein the one or more processors are configured to obtain at least a portion of the movement indicative data from the sensor onboard the one or more non-propulsion-generating vehicles.

8. The vehicle collision avoidance system of claim 1, wherein the one or more processors are configured to determine the sequential order of the vehicles based on the movement indicative data that represents movement of the vehicles along a curved segment of a route.

9. A method for avoiding collision between vehicle systems, the method comprising:
obtaining movement indicative data from plural sensors separately disposed onboard different vehicles of separate vehicle systems, the movement indicative data individually representing separate movements of the different vehicles;
determining an identification of which of the vehicles are included in which of the separate vehicle systems based on the movement indicative data that are obtained;
identifying a collision risk between two or more of the different vehicle systems based on the movement indicative data that are obtained and the identification of which of the vehicles are in which of the separate vehicle systems;
automatically changing the movement of at least one of the vehicle systems responsive to identifying the collision risk;
receiving a beacon signal from a beacon device disposed at a designated location, and
wherein the identification of which of the vehicles are included in each of the separate vehicle systems also is based on receipt of the beacon signal.

10. The method of claim 9, wherein the movement indicative data represents one or more of geographic locations, headings, or moving speeds of the vehicles.

11. The method of claim 9, wherein at least one of the separate vehicle systems includes one or more propulsion-generating vehicles and one or more non-propulsion-generating vehicles, and
wherein a portion of the movement indicative data is obtained from the sensor onboard the one or more non-propulsion-generating vehicles.

12. The method of claim 9, further comprising:
determining a sequential order of the vehicles in at least one of the separate vehicle systems based on the movement indicative data that are obtained.

13. The method of claim 12, wherein the sequential order of the vehicles is determined based on the movement indicative data that represents movement of the vehicles along a curved segment of a route.

14. A vehicle collision avoidance system comprising:
one or more sensors configured to generate signals of detected movement utilized to provide movement indicative data that separately indicates individual movements of different vehicles included in separate vehicle systems; and
one or more processors configured to determine an identification of which of the vehicles are included in which of the separate vehicle systems based on the movement indicative data that are obtained, the one or more processors also configured to determine a sequential order of the vehicles in at least one of the separate vehicle systems based on the movement indicative data that are obtained.

15. The vehicle collision avoidance system of claim 14, wherein the one or more processors are configured to determine the sequential order of the vehicles based on the movement indicative data that represents the movements of the vehicles along a curved segment of a route.

16. The vehicle collision avoidance system of claim 14, wherein the movement indicative data include two or more of locations, headings, or moving speeds of the vehicles.

17. The vehicle collision avoidance system of claim 14, wherein the one or more sensors also are configured to receive a beacon signal sent by a beacon device at a designated location, wherein the one or more processors are configured to determine the identification of which of the vehicles are included in the separate vehicle systems also is based on the beacon signal.

18. The vehicle collision avoidance system of claim 14, wherein the one or more processors also are configured to determine an accuracy of a manifest of at least one of the separate vehicle systems based on the movement indicative data that are obtained.

* * * * *